(12) United States Patent
Ahmed Assem A. S. et al.

(10) Patent No.: US 10,079,849 B2
(45) Date of Patent: Sep. 18, 2018

(54) RISK ASSESSMENT OF OPEN WI-FI NETWORKS

(71) Applicant: International Business Machines Corporation, Armonk, NY (US)

(72) Inventors: Hitham Ahmed Assem A. S., Dublin (IE); Al Chakra, Durham, NC (US); Jonathan Dunne, Co Waterford (IE); Liam Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/753,539

(22) Filed: Jun. 29, 2015

(65) Prior Publication Data
US 2016/0381062 A1   Dec. 29, 2016

(51) Int. Cl.
*G06F 11/00* (2006.01)
*H04L 29/06* (2006.01)
*H04W 12/08* (2009.01)
*H04W 12/12* (2009.01)
*H04W 84/12* (2009.01)

(52) U.S. Cl.
CPC ......... *H04L 63/1433* (2013.01); *H04W 12/08* (2013.01); *H04W 12/12* (2013.01); *H04W 84/12* (2013.01)

(58) Field of Classification Search
CPC .............................................. H04L 29/06877
See application file for complete search history.

(56) References Cited

U.S. PATENT DOCUMENTS

| | | | | |
|---|---|---|---|---|
| 8,683,052 | B1* | 3/2014 | Brinskelle | H04L 63/0823 709/228 |
| 9,713,078 | B2* | 7/2017 | Kuru | H04W 48/18 |
| 2007/0233787 | A1* | 10/2007 | Pagan | G06Q 10/107 709/206 |
| 2009/0064299 | A1* | 3/2009 | Begorre | H04W 12/12 726/7 |
| 2014/0250533 | A1* | 9/2014 | Basavapatna | H04W 4/02 726/25 |

FOREIGN PATENT DOCUMENTS

CN    103313429 A    9/2013

OTHER PUBLICATIONS

Appendix P, Jun. 29, 2015.

* cited by examiner

*Primary Examiner* — Christopher J Brown
(74) *Attorney, Agent, or Firm* — Garg Law Firm, PLLC; Rakesh Garg; Joseph Petrokaitis

(57) ABSTRACT

For assessing a risk associated with a Wi-Fi network, an analysis to evaluate a risk element associated with the Wi-Fi network is performed at a mobile device. From a result of the analysis, a risk value is determined. An overall risk value of the Wi-Fi network is to the risk value. Whether the overall risk value exceeds a risk tolerance threshold is evaluated. An activity on the device is prevented from using the Wi-Fi network at least when the overall risk value exceeds the threshold, and permitted when the overall risk value does not exceed the threshold. A visual attribute is assigned to the risk value according to a scale on which the risk value is measured. The visual attribute is presented on the device as a reason for preventing the use. The Wi-Fi network, the risk element, and the overall risk value are reported to a repository.

14 Claims, 5 Drawing Sheets

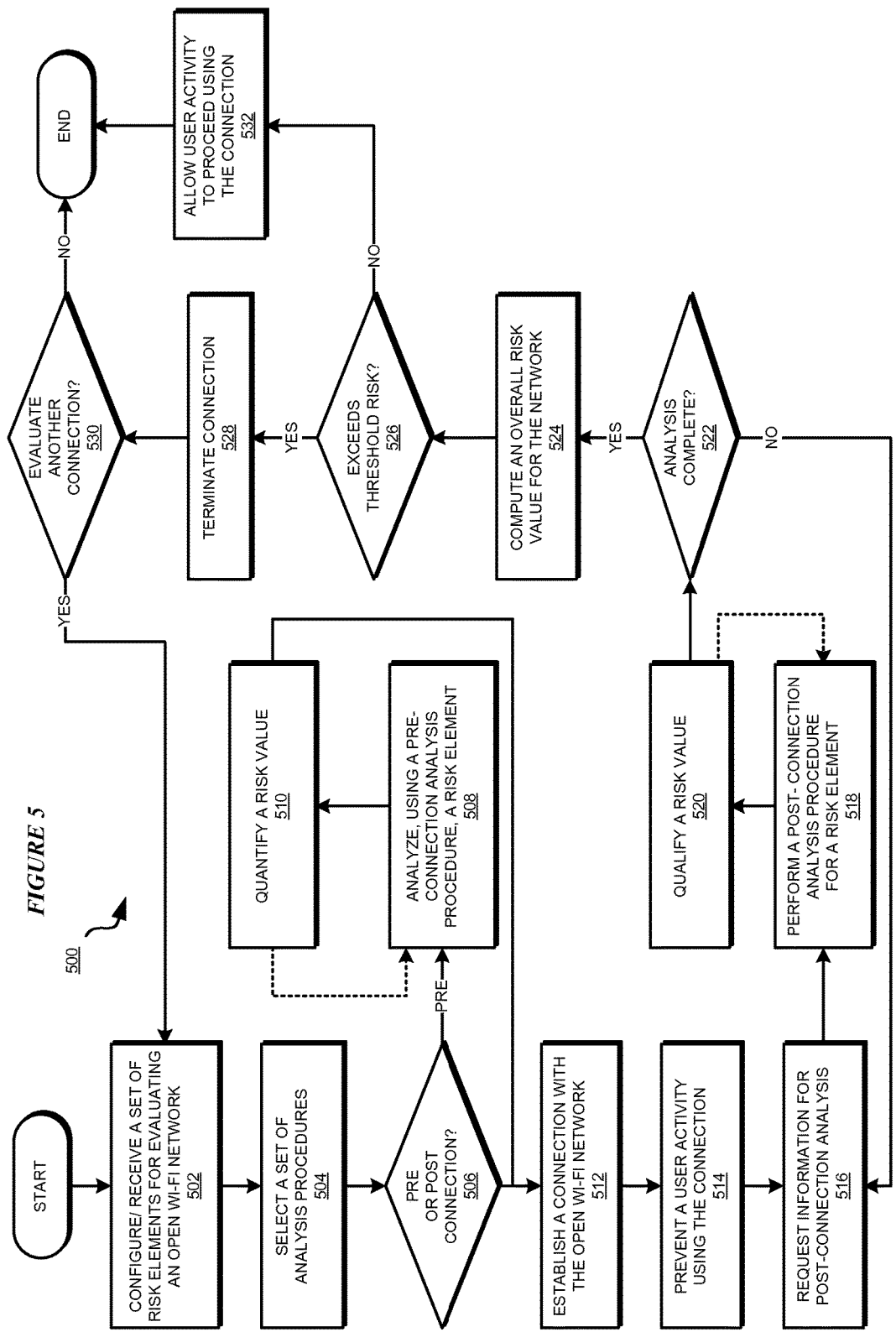

RISK ASSESSMENT OF OPEN WI-FI NETWORKS

TECHNICAL FIELD

The present invention relates generally to a method, system, and computer program product for using open Wi-Fi connections. More particularly, the present invention relates to a method, system, and computer program product for risk assessment of an open Wi-Fi network.

BACKGROUND

Users with portable computing devices often find themselves looking for data connectivity at a variety of locations. Particularly, users prefer to connect using a Wi-Fi network that is open or available for guest users to use, as compared to a cellular data network, which often comes at a cost to the users.

Many businesses and other establishments offer free Wi-Fi to attract patrons. It is not uncommon to detect many open Wi-Fi networks at a given location.

Different Wi-Fi networks are configured differently to allow users to connect to those networks. Many Wi-Fi network configurations are not desirable for a variety of reasons. Users generally do not know any more about an open Wi-Fi network than whether the Wi-Fi network is secure or open. Because only authorized users, or users with the security key can access, guest users are relegated to open Wi-Fi networks with nothing more than a warning that the network the user is connect to is not secured.

SUMMARY

The illustrative embodiments provide a method, system, and computer program product for risk assessment of an open Wi-Fi network. An embodiment includes a method for assessing a risk associated with a Wi-Fi network. The embodiment performs, using a processor in a mobile data communication device, a first analysis procedure configured to evaluate a first risk element associated with the Wi-Fi network. The embodiment determines, from a result of the first analysis procedure, a first risk value corresponding to the first risk element. The embodiment sets an overall risk value of the Wi-Fi network to the first risk value. The embodiment evaluates whether the overall risk value exceeds a risk tolerance threshold. The embodiment prevents an activity on the device from using the Wi-Fi network at least responsive to the overall risk value exceeding the risk tolerance threshold, where the activity is permitted to use the Wi-Fi network when the overall risk value does not exceed the risk tolerance threshold. The embodiment assigns a visual attribute to the first risk value from a set of visual attributes, where the set of visual attributes corresponds to a scale on which the first risk value is measured. The embodiment presents the visual attribute on the device as a reason for the preventing. The embodiment reports the Wi-Fi network, the first risk element, and the overall risk value to a repository.

Another embodiment includes a computer usable program product comprising a computer readable storage device including computer usable code for assessing a risk associated with a Wi-Fi network.

Another embodiment includes a data processing system for assessing a risk associated with a Wi-Fi network.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts a flowchart of an example process for risk assessment of an open Wi-Fi network in accordance with an illustrative embodiment.

DETAILED DESCRIPTION

Figure 1:
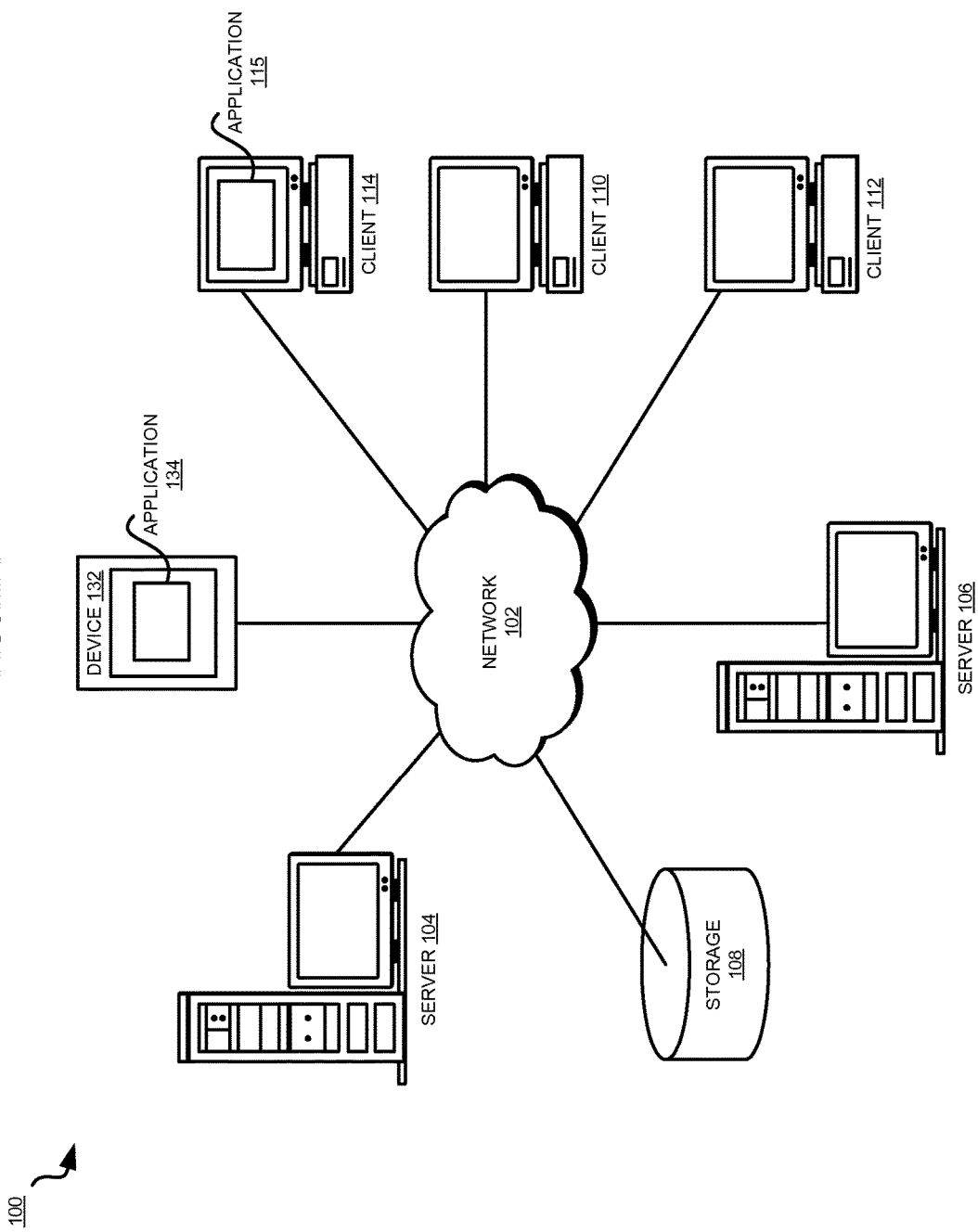
FIG. 1 depicts a block diagram of a network of data processing systems in which illustrative embodiments may be implemented.

The illustrative embodiments recognize that connecting to an open Wi-Fi network is fraught with risks. For example, user data that is transmitted over an open Wi-Fi network is susceptible to packet snooping and other malicious actions. As another example, connecting to an open Wi-Fi network can also open backdoors into the user's device and the data contained thereon. Malicious software can be downloaded or installed on the user's device over open Wi-Fi networks, and relentless advertising and popup messages can hinder or prevent productive use of the user's device.

The illustrative embodiments further recognize that most users are not technology savvy enough or well equipped enough to be able to indulge in a detailed audit of an open Wi-Fi network before performing transactions and other operations over that network. Even if an open Wi-Fi network has more risk factors associated therewith than a user would prefer, the user often cannot uncover those risk factors to determine whether to connect with that network.

The illustrative embodiments also recognize that even when a user has a bad experience with an open Wi-Fi network, that experience and the knowledge of the undesirability of the open Wi-Fi network remains with the user. Presently, another user has no way of benefiting from a previous user's experience with the open Wi-Fi network so that the other user may avoid connecting with an open Wi-Fi network that may be malicious or risky.

Presently, a user can elect to connect or not connect with certain open Wi-Fi networks. For example, the user can configure a device such that certain Wi-Fi networks are remembered or saved for future connections, some require user's express permission or input to connect, and the user can specify whether to attempt connections with any open Wi-Fi networks at all. However, a user presently cannot specify how to measure an open Wi-Fi network's overall risk value, which risk factors or risk elements associated with an open Wi-Fi network are acceptable to a user, and what the user's risk tolerance threshold might be with respect to an overall risk of connecting with an open Wi-Fi network.

The illustrative embodiments used to describe the invention generally address and solve the above-described problems and other problems related to using open Wi-Fi networks. The illustrative embodiments provide a method, system, and computer program product for risk assessment of an open Wi-Fi network.

One or more embodiments described herein can be implemented as an application executing using a processor and a memory in mobile device associated with a user. Any reference to a "network" is a reference to an open Wi-Fi network, and "open Wi-Fi network" and "network" are used interchangeably unless expressly specified otherwise where used.

An embodiment detects the availability of one or more open Wi-Fi networks at a location of the device. The embodiment is configured with a set of risk elements, which can be evaluated for open Wi-Fi networks. One embodiment is configured to select all or a default subset of the risk elements and analyze the open Wi-Fi network for assessing values corresponding to the selected risk elements. Another embodiment allows a user to select all or a subset of the risk elements and analyze the open Wi-Fi network for assessing values corresponding to the selected risk elements.

A variety of risk elements can be associated with an open Wi-Fi network. Some non-limiting examples of the risk elements include but are not limited to a type of encryption that is supported, a communication or security protocol that the network supports, a type of security key that can be used to access the network, a stability of the network signal, a speed or throughput of the network, a channel used by the network, a type of data carrier network that exists beyond the Wi-Fi access point with which the device connects, an internet service provider (ISP) that services the network, a location of the ISP, a Domain Name Server (DNS) used by the network, and the like.

As an example, a type of encryption that is supported can become a risk element of a network when the network or a server therein does not support a type of data encryption that the user prefers. For example, the network or a server therein may support digital signatures but not public key encryption of user content.

As an example, a communication or security protocol that the network supports can become a risk element of a network when the network or a server therein does not support a communication or security protocol that the user prefers. For example, the network or a server therein may support telnet but not secure shell (SSH).

As an example, a type of security key that can be used to access a network can become a risk element of the network when the network or a server therein does not support a type of security key that the user prefers. For example, the network or a server therein may support key length of 64 bits but not 128 bits.

As an example, a stability of the network signal can become a risk element of the network when the network signal changes, fades, or drops out intermittently. For example, the network signal may vanish while the user is in the middle of a transaction causing data loss or data corruption.

As an example, a speed or throughput of the network can become a risk element of the network when the network or a server therein does not support a data rate the user prefers. For example, the latency in the network or a server therein may cause user transactions to timeout causing data loss or data corruption.

As an example, a channel used by the network can become a risk element of the network when the network does not use a communication channel that the user prefers. For example, the user may prefer a certain Wi-Fi channel number for some user-specific reason but the network may use only on a different channel.

As an example, a type of data carrier network that exists beyond the Wi-Fi access point with which the device connects can become a risk element of the network when the network or a server therein does not support or use a type of data carrier network that the user prefers. For example, the network may be supported by a cellular data network at a router behind the Wi-Fi access point but the user may want to connect only on an optical fiber based network.

As an example, an ISP that services the network can become a risk element of the network when the ISP is other one or more ISPs that the user prefers. For example, the network or a server therein may use a local small ISP whereas the user may prefer a large well known ISP.

As an example, a location of the ISP can become a risk element of the network when the location of the ISP is other than a location that the user prefers. For example, the network or a server therein may use an ISP based in a foreign country whereas the user may prefer a domestic ISP.

As an example, a DNS used by the network can become a risk element of the network when the DNS is not preferred by the user. For example, the network or a server therein may use a DNS that is privately hosted by an establishment whereas the user would prefer to use a well known publicly available DNS.

Depending upon the risk element that is selected for evaluating a network, an embodiment selects an appropriate analysis procedure for that risk element. Some analysis procedures can be executed before connecting to the open Wi-Fi network, whereas some other analysis procedures require a connection with the network to determine a value for the corresponding risk element. For example, while a procedure to determine a supported key length can be performed without connecting with the network—i.e., pre-connection, a procedure to determine which ISP is servicing the network can be executed once a connection has been established, i.e., post-connection.

As some more examples, channel and stability related risk elements can be determined pre-connection, post-connection, or both. The DNS can be identified by configuring the analysis procedure with a command or operation, which when executed post-connection reveals the identity of the DNS. The analysis procedure then compares the identified DNS with a list of preferred DNS to assess the corresponding risk element.

Similarly, the type of network at a router behind the access point can be identified by configuring the analysis procedure with a suitable command or operation, which when executed post-connection reveals the type of the network either directly or behaviorally. The analysis procedure then compares the identified network or behavior with a list of preferred networks or behaviors to assess the corresponding risk element. Other analysis procedures for other risk elements can similarly be configured to execute pre-connection, post-connection, or both, depending on the information needed for the analysis and the manner of reaching the location of such information.

The above-described example risk elements will enable those of ordinary skill in the art to configure many other risk elements in a similar manner, and such other risk elements are contemplated within the scope of the illustrative embodiments. Furthermore, given a risk element, different implementations can adopt or design different analysis procedures for evaluating the risk element. The analysis procedures can be too numerous and too vastly diversified to even list in this disclosure. From this disclosure, those of ordinary skill in the art to configure many analysis procedures for many types of risk elements, and such other procedures are contemplated within the scope of the illustrative embodiments.

An analysis procedure produces a value for a corresponding risk element relative to a network. The risk value can be a binary value or a value on a suitable scale. For example, if the DNS used by the network is or is not on a user's preferred DNS list, then the analysis procedure may produce a Yes (1) or a No (0) value. As another example, if the throughput of the network is 50 Kilobits per second (KBPS), and the user-defined 1-10 throughput scale is from 10 KBPS (lowest at 1) to 15 Megabits per second (MBPS) (highest at 10), the value of the throughput risk element would be somewhere between 1 and 2 on the 1-10 scale.

An embodiment evaluates all selected risk elements by performing their corresponding analysis procedures. If an analysis procedure requires a connection with the network, the embodiment establishes the connection but prevents user activity over that connection until the analysis of the network's risk is complete and the embodiment has determined that the network poses acceptable risk according to a user-configured risk threshold. If the network poses acceptable risk according to the user-configured risk threshold, such as when an overall risk value of the network is at or below a risk value threshold set by default or set by the user, the embodiment allows the user activity to proceed over the network. If the network poses unacceptable risk according to the user-configured risk threshold, such as when an overall risk value of the network exceeds the risk value threshold set by default or set by the user, the embodiment terminates the connection with the network without allowing the user activity to proceed over the network.

An embodiment combines the separate risk values determined from the separate analysis procedures for the selected risk elements. The combining of the several risk values to yield an overall risk value can be performed using any logic suitable for an implementation. As a simple example, binary values can be combined by determining whether there are more favorable binary answers than unfavorable, and outputting a combined value as favorable (1) if so, and unfavorable (0) otherwise. As another simple example, risk values on similar scales can be averaged to produce an overall value on the same scale. Risk values on different scales, including binary values, can be combined using some baselining or normalization method. Different risk elements can carry different weights, and their values can be weighted accordingly in the computation of the overall value.

These examples of risk values, weights, scales, and methods of combining are not intended to be limiting. From this disclosure, those of ordinary skill in the art will be able to conceive many other forms of risk values, weights, scales, and methods of combining, and the same are contemplated within the scope of the illustrative embodiments.

An embodiment further visualizes for the user the overall risk value assessment of an open Wi-Fi network. In one example embodiment, the overall risk value is color coded according to a color chart. The color chart can be user-configured or set by default. The color chart provides a color to represent a risk value. The overall risk value is assigned the corresponding color from the color chart. The embodiment uses the assigned color to color a graphical icon or image, a text of the network information, or some other aspect of the network that is visually perceptible to the user. Font size, font style, bolding, underlining, blinking, shading and many other ways of visualizing the overall risk value can similarly be used within the scope of the illustrative embodiments.

An embodiment further allows the information about the open Wi-Fi network and the overall risk value assessed for the network to be recorded in a repository. The repository is available to one or more other users such that another user can receive a previous user's evaluation of the network before connecting to the network. The repository can take the form of a database, a website, a social media page, or any other suitable form. When such a repository is available to an embodiment, the embodiment considers the published overall risk values of a network instead of or in conjunction with other analysis procedures as described herein.

A method of an embodiment described herein, when implemented to execute on a device or data processing system, comprises substantial advancement of the functionality of that device or data processing system in safely using open Wi-Fi networks. For example, prior-art only presents a list of networks to a user from which the user has to select a network without knowing the risks associated with that network. An embodiment dynamically analyzes one or more configurable risk elements associated with the network and presents to the user the results of the analysis in an easy to understand manner. Such manner of evaluating risks of open Wi-Fi networks is unavailable in presently available devices or data processing systems. Thus, a substantial advancement of such devices or data processing systems by executing a method of an embodiment is achieved by managing the risks associated with open Wi-Fi networks in an informed manner thereby increasing the safety and security of user data in using such networks.

The illustrative embodiments are described with respect to certain risk elements, analysis procedures, commands and operations, risk values, methods of computing, visualization, repository, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
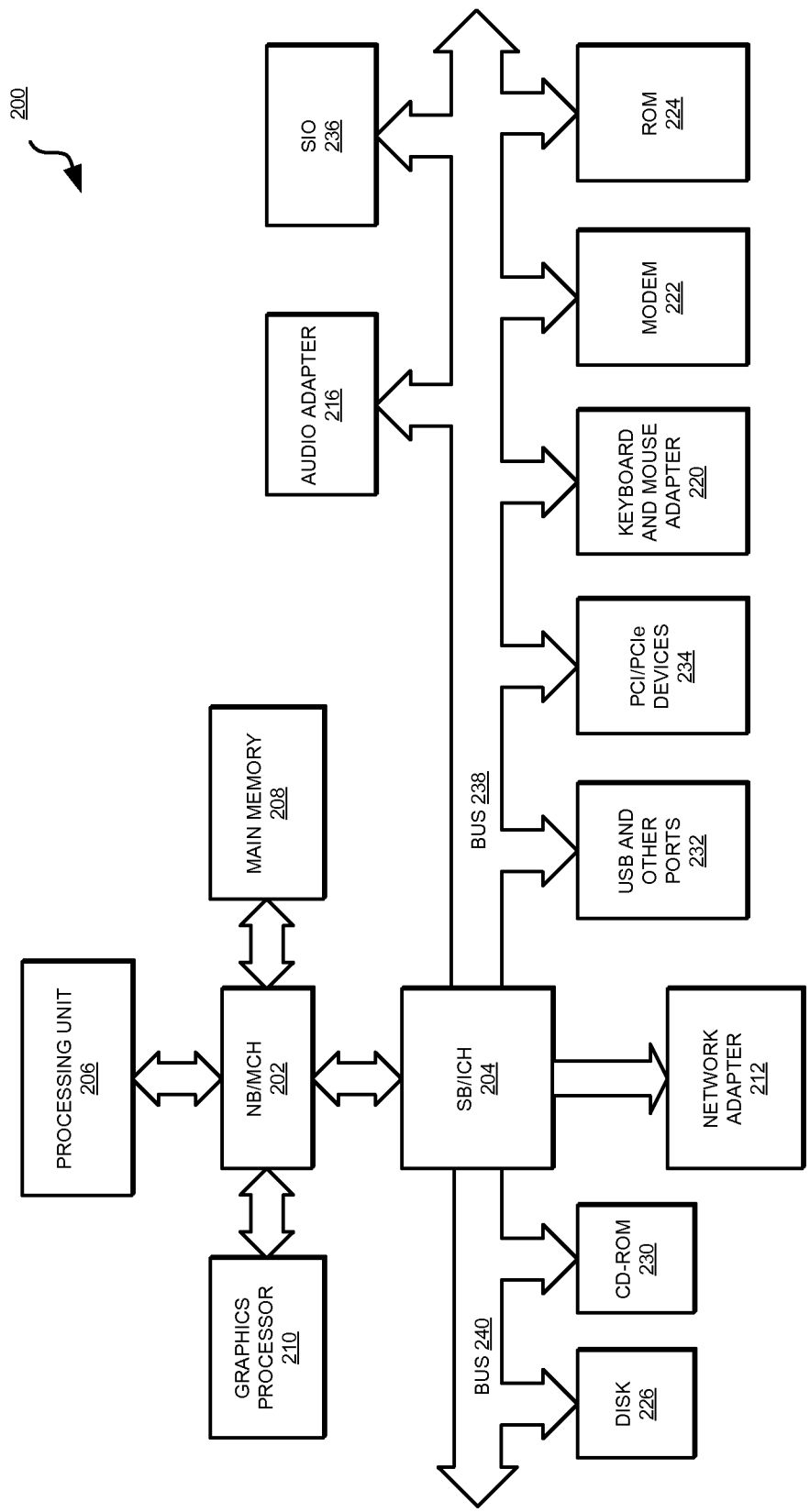
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Network 102 may be an open Wi-Fi network with which client 114 or device 132 attempts to establish data connectivity. When a user's device takes the form of client 114, which as an example may be a laptop computer, application 115 implements an embodiment described herein. When device 132 operates as a user's device, application 134 implements an embodiment described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as applications 115 and 134 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
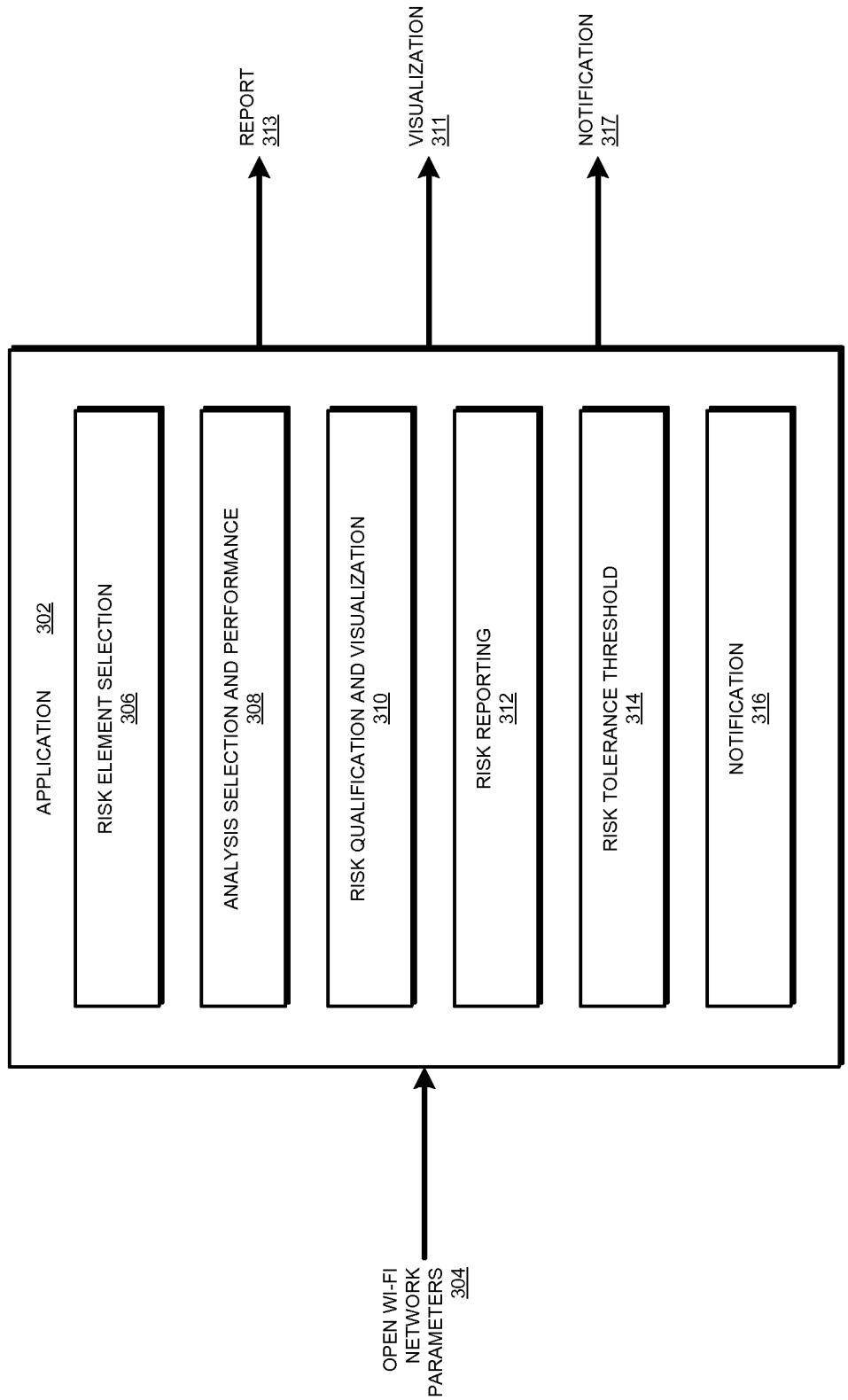
FIG. 3 depicts a block diagram of an example configuration for risk assessment of an open Wi-Fi network in accordance with an illustrative embodiment.

With reference to FIG. 3, this figure depicts a block diagram of an example configuration for risk assessment of an open Wi-Fi network in accordance with an illustrative embodiment. Application 302 is an example of application 134 or application 115 in FIG. 1.

Open Wi-Fi network parameters 304 include one or more parameters that an open Wi-Fi network broadcasts to any device that can detect the network. Some examples of parameters 304 include but are not limited to the Service Set Identifier (SSID) of a network, an indication of a signal strength of the network, channel number on which the network is operating, key type required to access the network, or some combination of some or all of these and other parameters depending upon the configuration of the network.

Component 306 selects one or more risk elements from a set of risk elements. In one embodiment, the selection is a default selection. In another embodiment, component 306 allows a user to select some or all of the risk elements from a list.

Component 308 selects the analysis procedures that correspond with the selected risk elements or a combination thereof. Component 308 performs the selected analysis procedures relative to a network whose parameters 304 are received as input. If an analysis procedure can be performed pre-connection, component 308 performs the analysis procedure before establishing a connection with the network. If an analysis procedure has to be performed post-connection, component 308 establishes the connection with the network, performs the analysis procedure using the network, and prevents a user activity from using the connection the risks associated with the network have been evaluated as acceptable.

Component 310 quantifies the result of an analysis procedure in the form of a risk value. Component 310 computes an overall risk value for the network. Component 310 further creates a visualization of one or more individual risk values, the overall risk value, or a combination thereof, in a manner described herein. For example, component 310 produces visualization 311, which in one example form could be a color coded indication associated with a visual representation of the network whose parameters 304 are received as input.

Component 312 reports the risks associated with the network whose parameters 304 are received as input. As one non-limiting example, component 312 produces report 313, which can be stored in a repository of open Wi-Fi network risk information that is available to other users.

Component 314 sets one or more default risk tolerance thresholds or allows a user to set one or more preferred risk tolerance thresholds. A risk tolerance threshold is a risk value which cannot be exceeded by a value of a risk element associated with a network, or by an overall risk value of the network, or some combination thereof, if the user is to use that network. A risk tolerance threshold can be set for an individual risk element, for the overall risk value of a network, or a combination thereof.

Component 314 uses one or more risk tolerance thresholds set therein to determine whether an individual risk element or the overall risk value of a network, as the case may be, exceeds a risk tolerance threshold. If the value of an individual risk element or the overall risk value of a network exceeds a risk tolerance threshold where that value should not exceed the risk tolerance threshold, component 314 terminates a connection if one was established for a post-connection analysis procedure, or prevents a connection from establishing with the network.

Component 316 produces notification 317. Notification 317 identifies the network, one or more of parameters 304, a risk value of an individual risk element, an overall risk value of the network, any visualizations produced by component 310, or some combination thereof. Notification 317 can be presented to the user on the device, can be sent to the repository where report 313 is sent, can be transmitted over social media or another channel to another user, or some combination thereof.

Figure 4:
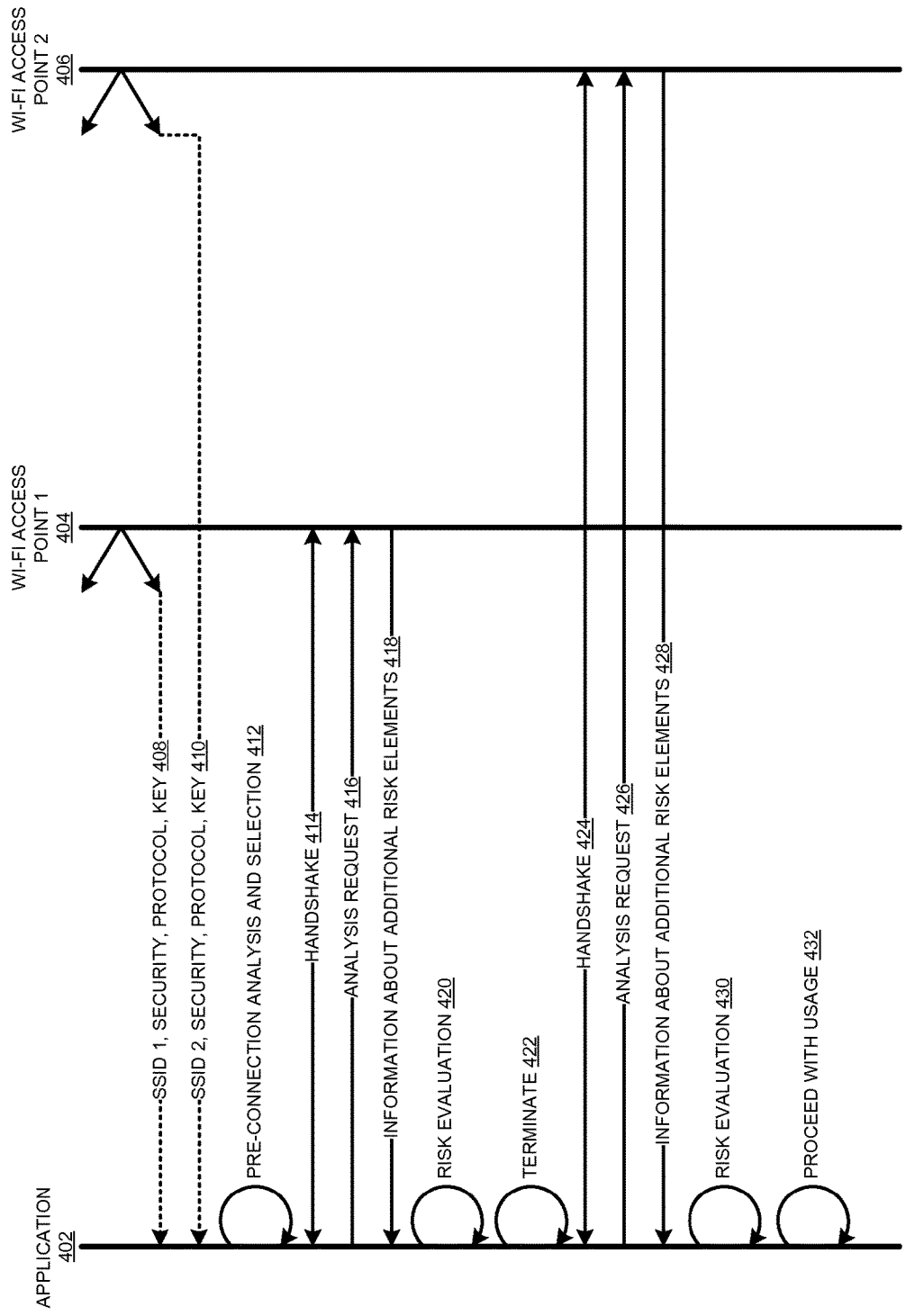
FIG. 4 depicts an example series of operations for risk assessment of an open Wi-Fi network in accordance with an illustrative embodiment.

With reference to FIG. 4, this figure depicts an example series of operations for risk assessment of an open Wi-Fi network in accordance with an illustrative embodiment. Application 402 is an example of application 302 in FIG. 3. Wi-Fi access point 1 (404) provides one open Wi-Fi network which application 402 can evaluate in a manner described herein. Wi-Fi access point 2 (406) provides another open Wi-Fi network which application 402 can evaluate in a manner described herein.

As an example, assume that access point 404 broadcasts (408) an SSID (SSID 1), a type of security used, a security or communication protocol used, a key type or size used, or some combination thereof as parameters 304 in FIG. 3. Similarly, as an example, assume that access point 406 also broadcasts (410) an SSID (SSID 2), a type of security used, a security or communication protocol used, a key type or size used, or some combination thereof as parameters 304 in FIG. 3.

Application 402 receives parameters from broadcasts 408 and 410. Application 402 selects one or more risk elements for evaluation and performs any pre-connection analysis (412) relative to one or both networks.

Suppose that a post-connection analysis is also needed. Therefore, as an example, application 402 elects to further evaluate the network of access point 404. Accordingly, application 402 performs handshake communication (414) with access point 404. Thereafter, once data connectivity is established between the device of application 402 and access point 404, application 402 sends analysis request 416 to the network of access point 404. Analysis request 416 can be a command or an operation configured in an analysis procedure as described herein.

In response to request 416, or as a consequence thereof, application 402 receives (418) information sufficient to assess additional risk elements whose evaluation needed the connection. The application evaluates individual selected risk elements and computes an overall risk value of the network of access point 404 (420).

Assume, as an example, that risk evaluation 420 results in a risk value that exceeds a risk tolerance threshold. Accordingly, application 402 terminates (422) the connection with the network of access point 404. Up to operation 422, application 402 prevents a use of the connection by other user activity on the device.

Now, as an example, application 402 elects to further evaluate the network of access point 406. Accordingly, application 402 performs handshake communication (424) with access point 406. Thereafter, once data connectivity is established between the device of application 402 and access point 406, application 402 sends analysis request 426 to the network of access point 406. Analysis request 426 can be a command or an operation configured in an analysis procedure as described herein.

In response to request 426, or as a consequence thereof, application 402 receives (428) information sufficient to assess additional risk elements whose evaluation needed the connection. The application evaluates individual selected risk elements and computes an overall risk value of the network of access point 406 (430).

Assume, as an example, that risk evaluation 430 results in no risk value exceeding a corresponding risk tolerance threshold. Accordingly, application 402 enables (432) a use of the connection by other user activity on the device.

With reference to FIG. 5, this figure depicts a flowchart of an example process for risk assessment of an open Wi-Fi network in accordance with an illustrative embodiment. Process 500 can be implemented in application 402 in FIG. 4.

The application configures or receives a set of risk elements for evaluating an open Wi-Fi network (block 502). The application selects a corresponding set of analysis procedures to evaluate the set of risk elements (block 504).

The application determines whether any pre-connection analysis procedures have been selected (block 506). If a pre-connection analysis procedure has been selected ("Pre" path of block 506), the application analyzes a risk element of the network using a pre-connection analysis procedure (block 508). The application quantifies the result of the analysis into a risk value corresponding to the risk element (block 510). Blocks 508 and 510 are repeated as many times as needed to perform all selected pre-connection analysis procedures.

If no pre-connection analysis procedure has been selected or all pre-connection analysis procedures have been performed and a post-connection analysis procedure has to be performed ("Post" path of block 506), the application establishes a connection with the network (block 512). The application prevents a user activity from using the connection (block 514).

The application requests additional information for performing a post-connection analysis procedure as described herein (block 516). The application analyzes a risk element of the network using a post-connection analysis procedure with the additional information (block 518). The application quantifies the result of the analysis into a risk value corresponding to the risk element (block 520). Blocks 518 and 520 are repeated as many times as needed to perform all selected post-connection analysis procedures.

The application determines whether the analysis is complete (block 522). If the analysis is not complete, such as when a result of an analysis procedure warrants an additional analysis procedure that was not previously selected at block 504 ("No" path of block 522), the application returns process 500 to block 516. In one embodiment, a pre-connection analysis procedure can also be performed post-connection. If the analysis is complete ("Yes" path of block 522), the application computes an overall risk value for the network (block 524).

The application determines whether the computed overall risk value, or an individual risk value which should be within a risk tolerance threshold, exceeds the risk tolerance threshold (block 526). If the risk tolerance threshold is exceeded ("Yes" path of block 526), the application terminates a connection with the network, if one was established to perform a post-connection analysis procedure (block 528).

Note that in some cases only pre-connection analysis will be sufficient to assess the risk of a network; and in some cases only post-connection analysis will be sufficient to assess the risk of a network. Process 500 is depicted with both pre and post-connection analysis steps only for the sake of completeness and not as a limitation on the illustrative embodiments. Process 500 can be adapted by those of ordinary skill in the art accordingly, and such adaptations are contemplated within the scope of the illustrative embodiments.

The application determines whether another network should be evaluated in a similar manner (block 530). If another network has to be evaluated ("Yes" path of block 530), the application returns process 500 to block 502. If another no other network is to be evaluated ("No" path of block 530), the application ends process 500 thereafter.

Back at block 526, if the risk tolerance threshold is not exceeded ("No" path of block 526), the application establishes a connection with the network if one has not already been established for post-connection analysis, and allows user activity to proceed by using the connection (block 532). The application ends process 500 thereafter.

Thus, a computer implemented method, system or apparatus, and computer program product are provided in the illustrative embodiments for risk assessment of an open Wi-Fi network. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for assessing a risk associated with a Wi-Fi network, the method comprising:
presenting, using a processor in a mobile data communication device, a set of risk elements in a list, the set of risk elements comprising (i) a type of a data carrier existing beyond an access point in the Wi-Fi network wherein the type of data carrier is selected between a cellular data network and an optical fiber based network, (ii) a geographical location of a service provider servicing the Wi-Fi network wherein the geographical location of the service provider is selected between a domestic service provider and a foreign service provider, (iii) a type of hosting of a domain name service used by the Wi-Fi network, (iv) a stability of a network signal of the Wi-Fi network, and (v) a Wi-Fi channel number used by the Wi-Fi network;
receiving a user input at the device, the user input selecting a first subset and a second subset of risk elements from the set of risk elements in the list, the first subset of risk elements including a plurality of the risk elements associated with the Wi-Fi network, the second subset of risk elements including at least the type of data carrier and the geographical location of the service provider;
selecting, from a set of analysis procedures, a subset of analysis procedures, the subset of analysis procedures including a first analysis procedure corresponding to the first subset of risk elements in the subset of risk elements;
performing, using the processor in the mobile data communication device, the first analysis procedure, wherein the first analysis procedure is configured to evaluate the first subset of risk elements before establishing a connection with the Wi-Fi network;
determining, from a result of the first analysis procedure, a first risk value corresponding to the first subset of risk elements;
establishing the connection with the Wi-Fi network while preventing a user-activity from occurring over the connection prior to a second analysis procedure;
performing the second analysis procedure, wherein the second analysis procedure is configured to evaluate a second subset of risk elements associated with the Wi-Fi network, wherein the second analysis procedure is performed after establishing the connection to the Wi-Fi network;
determining, from a result of the second analysis procedure, a second risk value corresponding to the second subset of risk elements;
setting an overall risk value of the Wi-Fi network using the first risk value and the second risk value; and
preventing the user-activity on the device from using the Wi-Fi network responsive to the overall risk value exceeding a risk tolerance threshold, wherein the activity is permitted to use the Wi-Fi network when the overall risk value does not exceed the risk tolerance threshold.

2. The method of claim 1, further comprising:
assigning a visual attribute to the first risk value from a set of visual attributes, wherein the set of visual attributes corresponds to a scale on which the first risk value is measured;
presenting the visual attribute on the device as a reason for the preventing; and
reporting the Wi-Fi network, the first subset of risk elements, and the overall risk value to a repository.

3. The method of claim 1, wherein the first analysis procedure is performed using a broadcasted parameter of the Wi-Fi network and without establishing a connection to the Wi-Fi network.

4. The method of claim 1, further comprising:
receiving a user input at the device to set the risk tolerance threshold.

5. The method of claim 1, wherein the visual attribute is a color of a graphical icon associated with information of the Wi-Fi network on the device.

6. The method of claim 1, wherein the repository is shared with a second device, and wherein the second device avoids connecting to the Wi-Fi network responsive to the reporting.

7. A computer usable program product comprising a computer readable storage device including computer usable program code for assessing a risk associated with a Wi-Fi network, the computer usable program code comprising:
computer usable code for presenting, using a processor in a mobile data communication device, a set of risk elements in a list, the set of risk elements comprising (i) a type of a data carrier existing beyond an access point in the Wi-Fi network wherein the type of data carrier is selected between a cellular data network and an optical fiber based network, (ii) a geographical location of a service provider servicing the Wi-Fi network wherein the geographical location of the service provider is selected between a domestic service provider and a foreign service provider, (iii) a type of hosting of a domain name service used by the Wi-Fi network, (iv) a stability of a network signal of the Wi-Fi network, and (v) a Wi-Fi channel number used by the Wi-Fi network;

computer usable code for receiving a user input at the device, the user input selecting a first subset and a second subset of risk elements from the set of risk elements in the list, the first subset of risk elements including a plurality of the risk elements associated with the Wi-Fi network, the second subset of risk elements including at least the type of data carrier and the geographical location of the service provider;

computer usable code for selecting, from a set of analysis procedures, a subset of analysis procedures, the subset of analysis procedures including a first analysis procedure corresponding to the first subset of risk elements in the subset of risk elements;

computer usable code for performing, using the processor in the mobile data communication device, the first analysis procedure, wherein the first analysis procedure is configured to evaluate the first subset of risk elements before establishing a connection with the Wi-Fi network;

computer usable code for determining, from a result of the first analysis procedure, a first risk value corresponding to the first subset of risk elements;

computer usable code for establishing the connection with the Wi-Fi network while preventing a user-activity from occurring over the connection prior to a second analysis procedure;

computer usable code for performing the second analysis procedure, wherein the second analysis procedure is configured to evaluate a second subset of risk elements associated with the Wi-Fi network, wherein the second analysis procedure is performed after establishing the connection to the Wi-Fi network;

computer usable code for determining, from a result of the second analysis procedure, a second risk value corresponding to the second subset of risk elements;

computer usable code for setting an overall risk value of the Wi-Fi network using the first risk value and the second risk value; and computer usable code for preventing the user-activity on the device from using the Wi-Fi network responsive to the overall risk value exceeding a risk tolerance threshold, wherein the activity is permitted to use the Wi-Fi network when the overall risk value does not exceed the risk tolerance threshold.

8. The computer usable program product of claim 7, further comprising:
computer usable code for assigning a visual attribute to the first risk value from a set of visual attributes, wherein the set of visual attributes corresponds to a scale on which the first risk value is measured;
computer usable code for presenting the visual attribute on the device as a reason for the preventing; and
computer usable code for reporting the Wi-Fi network, the first subset of risk elements, and the overall risk value to a repository.

9. The computer usable program product of claim 7, wherein the first analysis procedure is performed using a broadcasted parameter of the Wi-Fi network and without establishing a connection to the Wi-Fi network.

10. The computer usable program product of claim 7, further comprising:
computer usable code for receiving a user input at the device to set the risk tolerance threshold.

11. The computer usable program product of claim 7, wherein the visual attribute is a color of a graphical icon associated with information of the Wi-Fi network on the device.

12. The computer usable program product of claim 7, wherein the repository is shared with a second device, and wherein the second device avoids connecting to the Wi-Fi network responsive to the reporting.

13. A data processing system for assessing a risk associated with a Wi-Fi network, the data processing system comprising:
a storage device, wherein the storage device stores computer usable program code; and
a processor, wherein the processor executes the computer usable program code, and wherein the computer usable program code comprises:
computer usable code for presenting, by a mobile data communication device, a set of risk elements in a list, the set of risk elements comprising (i) a type of a data carrier existing beyond an access point in the Wi-Fi network wherein the type of data carrier is selected between a cellular data network and an optical fiber based network, (ii) a geographical location of a service provider servicing the Wi-Fi network wherein the geographical location of the service provider is selected between a domestic service provider and a foreign service provider, (iii) a type of hosting of a domain name service used by the Wi-Fi network, (iv) a stability of a network signal of the Wi-Fi network, and (v) a Wi-Fi channel number used by the Wi-Fi network;
computer usable code for receiving a user input at the device, the user input selecting a first subset and a second subset of risk elements from the set of risk elements in the list, the first subset of risk elements including a plurality of the risk elements associated with the Wi-Fi network, the second subset of risk elements including at least the type of data carrier and the geographical location of the service provider;
computer usable code for selecting, from a set of analysis procedures, a subset of analysis procedures, the subset of analysis procedures including a first analysis procedure corresponding to the first subset of risk elements in the subset of risk elements;
computer usable code for performing, using the processor in the mobile data communication device, the first analysis procedure, wherein the first analysis procedure is configured to evaluate the first subset of risk elements before establishing a connection with the Wi-Fi network;
computer usable code for determining, from a result of the first analysis procedure, a first risk value corresponding to the first subset of risk elements;
computer usable code for establishing the connection with the Wi-Fi network while preventing a user-activity from occurring over the connection prior to a second analysis procedure;
computer usable code for performing the second analysis procedure, wherein the second analysis procedure is configured to evaluate a second subset of risk elements associated with the Wi-Fi network, wherein the second analysis procedure is performed after establishing the connection to the Wi-Fi network;

computer usable code for determining, from a result of the second analysis procedure, a second risk value corresponding to the second subset of risk elements;

computer usable code for setting an overall risk value of the Wi-Fi network using the first risk value and the second risk value; and computer usable code for preventing the user-activity on the device from using the Wi-Fi network responsive to the overall risk value exceeding a risk tolerance threshold, wherein the activity is permitted to use the Wi-Fi network when the overall risk value does not exceed the risk tolerance threshold.

14. The data processing system of claim 13, further comprising:

computer usable code for assigning a visual attribute to the first risk value from a set of visual attributes, wherein the set of visual attributes corresponds to a scale on which the first risk value is measured;

computer usable code for presenting the visual attribute on the device as a reason for the preventing; and computer usable code for reporting the Wi-Fi network, the first subset of risk elements, and the overall risk value to a repository.

* * * * *